United States Patent [19]

Legris

[11] 4,257,576
[45] Mar. 24, 1981

[54] ROTARY COCKS CARRYING SPHERICAL SEALS

[75] Inventor: Andre Legris, St-Maur, France

[73] Assignee: Legris Incorporated, Rochester, N.Y.

[21] Appl. No.: 21,466

[22] Filed: Mar. 19, 1979

Related U.S. Application Data

[62] Division of Ser. No. 745,643, Nov. 29, 1976, Pat. No. 4,172,584.

[30] Foreign Application Priority Data

Dec. 9, 1975 [FR] France ............................ 75 37647

[51] Int. Cl.³ .............................................. F16K 5/06
[52] U.S. Cl. .................................................. 251/315
[58] Field of Search ................ 137/315; 251/304, 315, 251/298

[56] References Cited

U.S. PATENT DOCUMENTS

| 1,784,381 | 12/1930 | O'Stroske | 251/315 |
| 3,112,758 | 12/1963 | Norton | 137/315 |
| 3,191,906 | 6/1965 | Zeigler et al. | 251/304 |
| 3,496,958 | 2/1970 | Magnusson et al. | 251/298 |
| 3,528,448 | 9/1970 | Urban | 137/315 |
| 4,073,471 | 2/1978 | Lehtinen | 251/298 |
| 4,150,811 | 4/1979 | Condit | 251/298 |
| 4,172,584 | 10/1979 | Legris | 251/315 |
| 4,175,580 | 11/1979 | Kalbfleisch | 137/315 |

FOREIGN PATENT DOCUMENTS

| 542625 | 11/1955 | Belgium | 251/298 |
| 2400699 | 10/1974 | Fed. Rep. of Germany | 137/315 |
| 1306503 | 9/1962 | France | 137/315 |

*Primary Examiner*—William R. Cline
*Assistant Examiner*—H. Jay Spiegel
*Attorney, Agent, or Firm*—Bucknam and Archer

[57] ABSTRACT

Cocks comprising a spherical shut-off member seated on a gasket and formed of a body connected to elements of a canalization of fluid and wherein there is rotatably mounted a shut-off member having a surface in the form of a spherical zone which is capable of coming into contact with a gasket of generally annular shape secured in said body, wherein the shut-off member is extended at the side corresponding to the largest diameter of the surface of the spherical zone form by two lugs which extends parallel to the axis of the shut-off member passing through its center, one of said lugs being connected by a connection means having play to a manipulation member rotatably mounted in the body and the other lug having the shape of a fork the central recess of which is engaged on a stub integral with the body. The invention is also concerned with a method of mounting such cocks.

1 Claim, 19 Drawing Figures

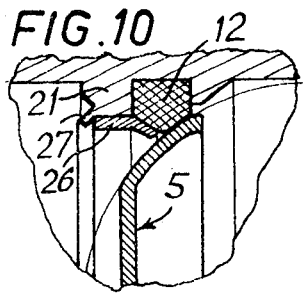
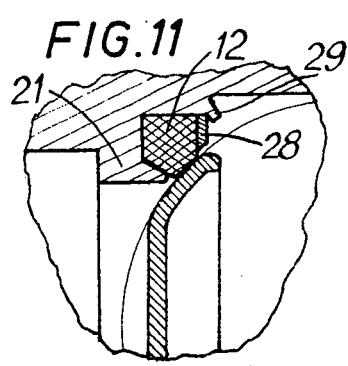
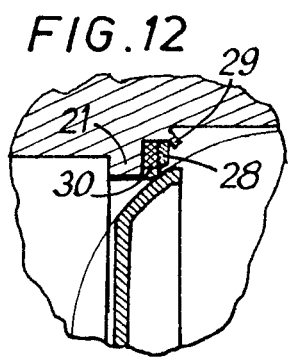
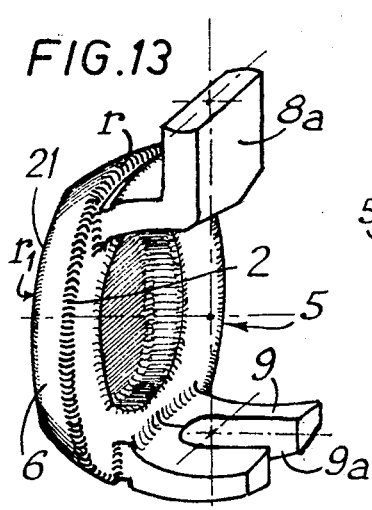
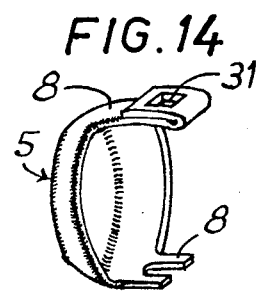
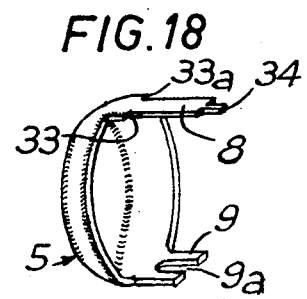
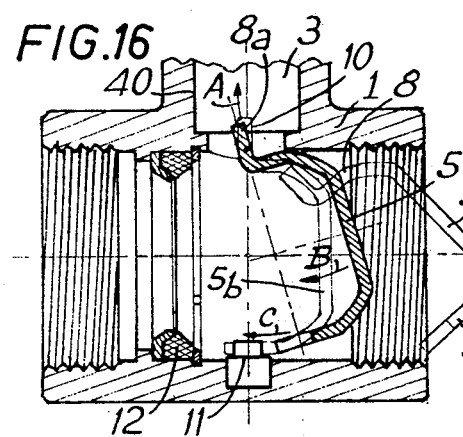
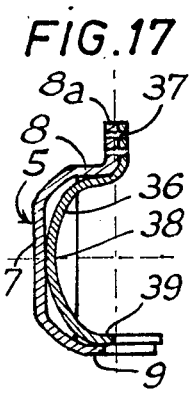
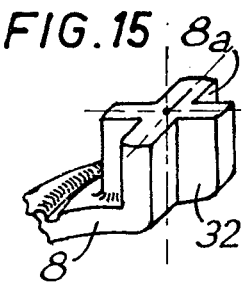
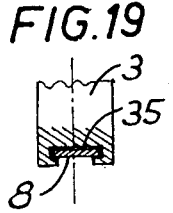

ROTARY COCKS CARRYING SPHERICAL SEALS

This is a division, of application Ser. No. 745,643 filed Nov. 29, 1976, now U.S. Pat. No. 4,172,584.

The object of the present invention is an improvement to cocks comprising a shut-off member of spherical seal seating.

It is known to utilise cocks in which the rotary shut-off member has a portion of spherical surface bearing on a sealing gasket for the closing position and adapted to pivot so as to occupy an open position corresponding to free flow of fluid. This shut-off arrangement compared to those comprising a shell of a complete sphere pierced by a simple aperture has the advantage of providing a much larger passage for the same diameter of sphere in the same body. This is thus in principle an economic system since it necessitates a smaller body, and thus a less costly one, for the same through-flow.

This technique is well known and described in numerous published documents.

However, this device nevertheless has drawbacks which greatly impair its economy, raise its cost and prevent its advantages to be exploited.

Thus, when the prior art disclosed in the existing patents is studied the following disadvantages are readily observed. The shut-off member of part-spherical surface has the form of a cut ball obtained by milling or by removal of material by machining, of a crank having a spherical out-of-centre portion, of a segment of a sphere provided with a tube guiding the fluid in open position, or of a segment of a sphere.

However, on account of its large cross-section this shut-off member cannot enter into the main bore of the cock for being installed. Consequently, for installation purposes the body is divided into two or even three large, rough, pieces. This arrangement makes the body one and a half times to three times more expensive than a simple body of one piece.

In fact, the sum of the pieces is more costly and moreover, it is necessary to achieve tightness therebetween, which requires machining, assembly operations, and additional gaskets and fastening elements.

In the case of the device where the shut-off member of part-spherical surface is carried by an element having the aspect of a crank it should be emphasized that a very large plug is provided which is intended to permit the passage of the device through the manipulation axis; this plug is very expensive and requires resistant sealing gaskets, and furthermore, the plug must be perfectly held by large screws since, by virtue of its large surface, it is subjected to a strong thrust resulting from the pressure of the fluid. A further drawback frequently resides at the level of the gaskets providing the tightness on the spherical seat of the shut-off member, more particularly those which are secured in the body. The diameter of the gaskets being very large, it is sometimes impossible to instal them other than by dividing the body into two or three bulky main pieces, which is very costly.

A further disadvantage resides in the fact that there is frequently employed an axis of the shutter which is slightly offset relative to its seat, so as to obtain a predetermined hold on the seat upon closing. This device complicates the conception and the execution in a major way, and it entrains a considerable increase of the cost price which is unacceptable for cocks of current utilisation.

Finally, a last disadvantage resides in the fact that the shut-off members of part-spherical surface in use often require the utilisation of two guidance members in rotation, which renders them unsuitable for self-sealing and necessitates the use of more complex and more costly gaskets which themselves provide self-sealing by compensation effect.

Recourse is occasionally also had to seats which are adjustable by threadable position adjustment, but such a method is never practicable, nor are such means easy to adjust and this creates problems of tightness at the level of the thread of the seat and lacks accessability after installation.

All these devices and their improvements entrain additional costs by virtue of the complications of manufacture and assembly.

It is the aim of the present invention to obtain a cock comprising a shut-off member having a surface in the form of a spherical zone in which cock the above enumerated disadvantages are absent.

In accordance with the present invention the shut-off member is extended at the side corresponding to the largest diameter of the surface of the spherically shaped zone by two lugs which extend parallel to the axis of the shut-off member passing through its centre, one of said lugs being connected by a connection means having play to a manipulation member rotatably mounted in the body and the other lug having the form of a fork the central scooped out portion of which is engaged on a stub integral with the body.

The device according to the invention permits the following advantages to be obtained:

The possible increased through-flow of fluid for the same connected piping at reduced cost, A reduction of bulk in terms of diameter and length of the body for the same diameter of passage;

A reduction of the cost of the body by the use of a body which is of one piece, is simple, is short, has a small outside diameter and a large inside diameter, and uses a small quantity of material;

Simplification of the construction of the cock by utilisation of a shut-off member which is always installed through the main bore of the body, enabling utilisation of the simple, one-piece body and requiring neither intermediate end connection nor a large plug on the manipulation axis.

Simplification of installation of the cock by very simple mounting of the shut-off member;

Reduction of the assembly cost by the use of a small number of pieces which are simple to instal;

Excellent self-sealing and at the same time correct guidance by the use of the fork which guides the shut-off member;

A weak torque resulting from the self-sealing on a single gasket;

Application for all current fluids and even ready adaptation to difficult problems of corrosion, temperatures, great pressures, vacuum;

Use of a shut-off member of low cost which needs no finishing operation, is obtained of stamped polished metal or by pressure-casting of plastics or metal;

A general and considerable reduction of the cost of the cock by using a small number of simple pieces of reduced cost and a simple and rapid assembly of a small number of components, and thus of low cost.

Other characteristics and advantages of the invention will become better understood upon reading the following description of a number of embodiments and referring to the accompanying drawings in which:

FIG. 10 is a view in partial section of the cock, showing a gasket housed in a neck and bearing on an abutment and retained by a cylindrical-conical tube which is crimped by the body, this arrangement leaving a large free passage for the cock;

FIG. 11 is a partial section showing a gasket supported by an abutment of low extent and retained by a washer which is crimped by the body. This arrangement leaves a large through-flow diameter for the fluid;

FIG. 12 is a sectional view of an embodiment similar to that of FIG. 11, the shaped gasket being replaced by a cut-out sealing washer which is in turn retained in the body by a washer crimped by the body. This arrangement leaves a large through-flow diameter for the fluid;

FIG. 13 is a view in perspective of a shut-off member according to the invention, obtained of material cast under pressure, plastics or metal, and showing the radiuses which are necessary for an operation which does not damage the gaskets;

FIG. 14 is a view in perspective of the shut-off member obtained in stamped metal, the entrainment lug of which member has been folded on itself so as to form a double thickness, and shows a square entrainment aperture;

FIG. 15 is a view of a partial detail of the entrainment lug of the segment of sphere which carries a right-angled reinforcing rib, giving a cruciform appearance;

FIG. 16 is a view of the assembly of the shut-off member in the body which has previously been equipped with its gasket and its stub;

FIG. 17 is a modification of FIG. 4 showing a shut-off member reinforced by a blade of spring steel secured to the entrainment lug;

FIG. 18 is a view in perspective of the shut-off member comprising a rectlinear entrainment lug;

FIG. 19 is a view in partial section of the manipulation spindle wherein a slot receiving the entrainment lug is provided.

Figure 1:
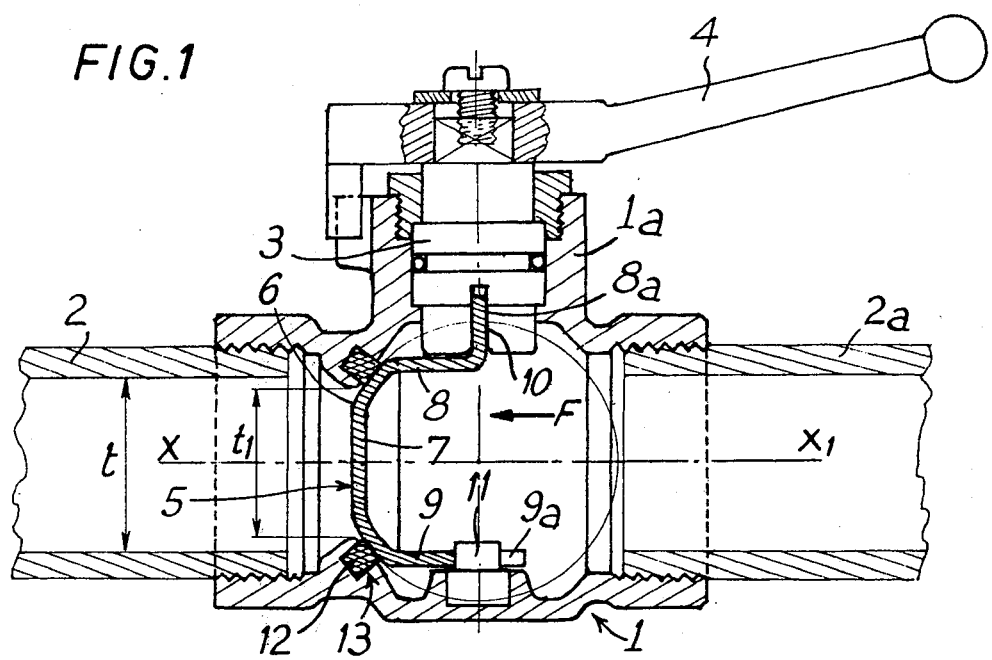
FIG. 1 is a view in longitudinal section of an improved cock in accordance with the invention, in closed operating position.
Figure 2:
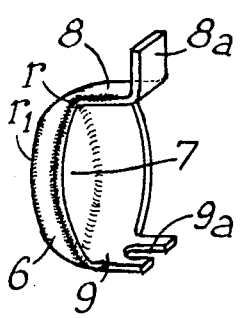
FIG. 2 is a view in perspective of an embodiment of the shut-off member of the cock in accordance with the invention.

In FIG. 1 there is shown an improved cock according to the invention, which comprises a body 1 mounted by its threaded ends in two elements 2, 2a of piping of inner diameter t, the said body having a head 1a wherein there is rotatably mounted in known manner a manipulation spindle 3 to which a manipulation handle 4 is secured, the said manipulation spindle 3 ensuring the entrainment of a rotatable shut-off member 5 shown in FIG. 2.

This shut-off member 5 is formed by a dome having a surface 6 in the shape of a spherical zone which is at one side closed by a flat bottom portion 7 and at the side of the largest diameter extended by two lugs 8 and 9 which extend parallel to the axis X X$_1$ of the shut-off member passing through the centre thereof, one of said lugs, 8, having a perpendicularly bent end portion 8a directed toward the exterior and engaged with some play in a slot 10 provided at one of the ends of the manipulation spindle 3.

The other lug 9 which has the shape of a fork the scooped out portion 9a of which is engaged on a stub 11 secured to the body 1 of the cock is positioned at the remote end of the manipulation handle 3 and on the same axis.

When the shut-off member 5 is in the closing position as shown in FIG. 1 it bears with its surface 6 or spherical zone form against an annular sealing gasket 12 disposed in a neck 13 machined into the body 1. The rims of the spherical surface 6 of the shut-off member are provided with radii r, r$_1$ which prevent the sealing gasket 12 being damaged upon rotation of the shut-off member.

The fluid flows through the body of the cock in the direction of the arrow F such that it keeps the shut-off member 5 in contact with the gasket 12 by the pressure exerted on the former, the said shut-off member 5 bearing freely on the gasket 12 as a result of the lug 9 of forklike shape sliding on the stub 11.

The shut-off member shown in FIG. 2 is mainly formed of a dome which is obtained, by cutting out and stamping, from a pre-polished metal sheet, in order to achieve a low cost price.

In FIG. 16 there is shown the mounting of the shut-off member 5 within the body 1 which has earlier been equipped with the gasket 12 and the stub 11. To this end the shut-off member 5 has to be obliquely engaged in the main bore of the body 1, as is shown at 5a, until the lug 8 arrives at the housing 40 of the manipulation spindle 3. The shut-off member 5 is then straightened in accordance with the arrow A and it is caused to rock in accordance with the arrows B and C so as to bring it in the position 5b where the forked lug 9 engages on the stub 11. The shut-off member is then turned 180° until it comes to rest against the gasket 12 and the manipulation spindle 3 is inserted in its housing 40 in such manner as to engage the end 8a of the lug in the slot 10. The shut-off member 5 is thus captive in the manipulation spindle and can no longer escape.

Figure 3:
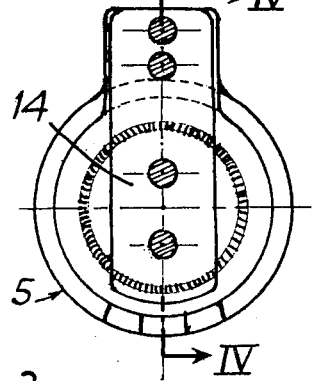
FIG. 3 is a view of the interior of the shut-off member according to the invention, reinforced by a tongue of welded metal.
Figure 4:
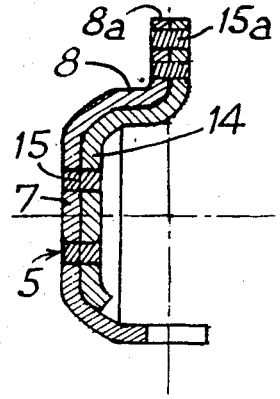
FIG. 4 is a sectional view of the shut-off member taken along the line IV—IV of FIG. 3.

FIGS. 3 and 4 show the same shut-off member 5 obtained by stamping but reinforced by a tongue 14 of cut out and arched metal which is welded at two points 15 to the bottom 7 and at two points 15a to the lug 8 of the shut-off member. The object of this arrangement is to strengthen against shearing the entrainment lug 8, 8a the resistance of which is thereby doubled relative to the lug by itself. This tongue may be welded by any known means.

Figure 5:
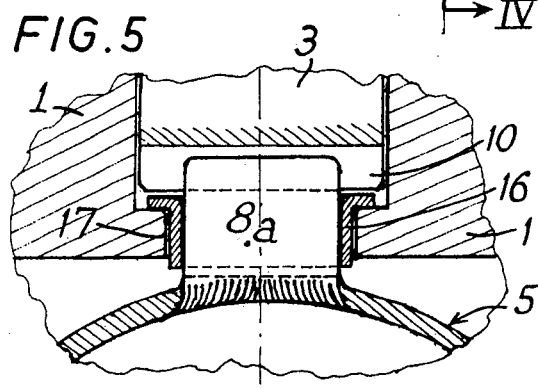
FIG. 5 is a sectional view in the plane of the lug driving the shut-off member, centred by a thin shouldered sleeve, helved to the end of the manipulation spindle.

In FIG. 5 there is shown the end of the manipulation spindle 3 which has the slot 10 wherein the bent end 8a of the lug 8 is engaged. A shouldered sheath 16 of thin sheet metal sleeve-fitted on the end of the manipulation spindle 3 is employed for the purpose of centering the end 8a of the lug which is engaged in said sheath 16 mounted in a bore 17 of the body 1.

This arrangement prevents the end 8a of the lug scraping against the body 1 of the cock when the shut-off member rotates, since the shut-off member being especially made of stainless steel sheet the lug 8 could damage the body which is made of coppery metal.

Figure 6:
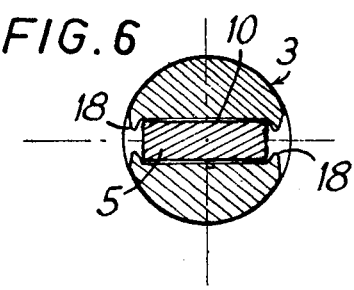
FIG. 6 is a section of the end of the manipulation spindle perpendicular to its axis, showing the centering of the lug of the shut-off member by crimpings of the edges of the slot of the manipulation spindle.

FIG. 6 shows a view in transverse section of the manipulation spindle 3 in which the end 8a of the lug is guided in the slot 10 by pads or beads 18 obtained by crimping the edges of the slot 10.

This arrangement also has the object of preventing the end 8a of the lug scraping the interior of the body.

Figure 7:
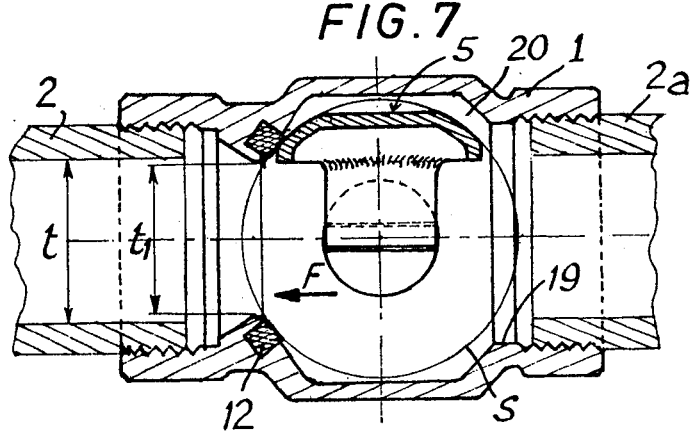
FIG. 7 is a section through the principal axis of the cock showing a cylindrical hollow of the body in which the shut-member is in open position.

In FIG. 7 there is shown a cock according to the invention, provided with its piping elements 2, 2a, with the shut-off member 5 in open position. This position leaves a free passage of diameter $t_1$ for the fluid, which is very close to the diameter t of the piping 2, 2a. It can also be seen that in its rotary movement the shut-off member 5 describes a sphere S of a diameter which is greater than that of the bore, notwithstanding the fact that the shut-off member 5 has been inserted by passing through the bore 19.

To this end a cylindrical cavity 20 is provided in the body 1 and has a length which is suitable for free rotation of the shut-off member 5, although its depth is never a great one.

Figure 8:
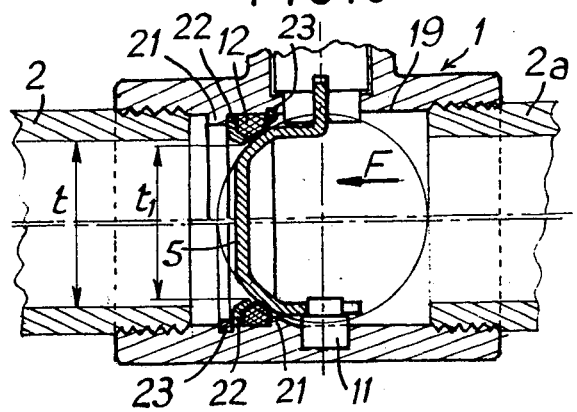
FIG. 8 shows a body of great cylindrical inner diameter and possessing an internal abutment of low profile for the support of a sealing gasket, either directly or through the intermediary of a washer, a free passage t1 of 0.8 to 1 of the passage t of the channel remaining.

In the upper half view of FIG. 8 there is shown an abutment element 21 annularly shaped to the interior of the body 1 and having a low relief and a short length interiorly of the bore 19.

This abutment element is utilised for the direct support of the sealing gasket 12 or indirectly through the intermediary of a washer 22 as is shown in FIG. 8, the said gasket being held at its other face by a resilient clip or washer 23 disposed in a neck of the body 1. In the lower half view of FIG. 8 the position of the abutment element 21 and of the clip are inverted.

This arrangement affords a free passage $t_1$ which is comprised between 0.8 and 1 of the canalization t of the connection. This arrangement also permits an overall body having an internal bore of very great diameter to be utilised and thus to obtain a significant saving in the material of the body.

Figure 9:
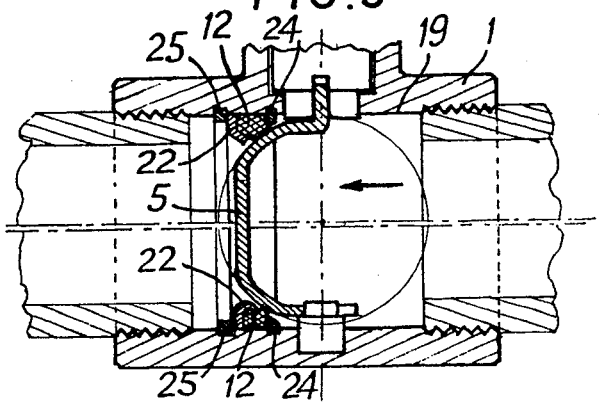
FIG. 9 is a sectional view through the axis of the cock, showing a body of a large, smooth, internal diameter comprising two necks of small depth serving as housings for two clips for the direct or indirect support of the sealing gasket, the body affords a free passage t1 comprised between 0.8 and 1 of the diameter t of the channel.

In FIG. 9 a different mounting of the gasket 12 is shown which comprises two necks machined in the bore 19 of the body 1 in which there are disposed clips 24, 25 or resilient split washers between which the gasket 12 is either directly sandwiched, or with interpositioning of a washer 22.

In the lower half view of FIG. 9 this washer 22 has a slightly different form. This arrangement enables a free passage $t_1$ equalling a value comprised between 0.8 and 1 of the diameter t of the canalization to be obtained. Moreover, this arrangement permits an overall body of maximum possible diameter to be utilised, that is to say corresponding to the leading tapping aperture of the inlet and outlet threads. It is thus possible to utilise a body of very large overall diameter and thereby achieve significant economies of metal of the body.

A modified embodiment is shown in FIG. 10 wherein the gasket 12 of flexible or semi-flexible material is held in its groove by a thin ring 26 of cylindrical-conical form, the said ring 26 being retained by a crimped portion 27 of the body 1.

In FIG. 11 there is shown a different mode of mounting the gasket 12 which is supported against an abutment member 21 under the action of a washer 28 retained by a crimped portion 29 of the body 1.

In FIG. 12 there is shown a view similar to that of FIG. 11, but wherein the gasket of form 12 has been replaced by a simple sealing washer 30 maintained by a washer 28 and a crimped portion 29.

FIGS. 10, 11, 12, 8, 9, 16, 1 show seats which make it possible to obtain a great through-flow of fluid in the body and to employ bodies with a small amount of metal due to a large blank internal aperture. The seats of large diameter should be utilised in association with shut-off members according to the invention so as to obtain an economic body having a wide internal passage and a small quantity of material.

Without going beyond the scope of the invention it is possible to employ any gaskets which are capable of usefully cooperating with the shut-off member and in particular gaskets of rubber of toric cross-section or annular gaskets of other shapes.

FIG. 13 shows a shut-off member according to the invention which can be obtained by pressure-casting in plastics material or in metal. The shapes are studied with this end in mind and the radii r and $r_1$ enable the shut-off member to be utilised without machining after casting.

In FIG. 14 there is shown a shut-off member 5 of stamped metal the lug 8 of which has been folded back onto itself and wherein a housing 31 of square shape has been cut out which housing is intended to receive a boss of corresponding section provided on the end of the manipulation spindle 3. Thus this lug 8 has a thickness and a rigidity which are sufficient for entrainment of the shut-off member.

The entrainment lug 8 of the shut-off member shown in FIG. 15 comprises in its bent portion 8a a reinforcing rib which gives it a cruciform appearance.

This embodiment has the object of imparting increased strength and rigidity for the entrainment of the segment of sphere. This arrangement is readily driven by a manipulation spindle having at its end two slots formed at right angles relative to each other. This arrangement is particularly suitable for embodiments of components which have been pressure-cast of plastics material or metal.

In FIGS. 18, 19 there is shown a variant of the mode of entraining the shut-off member 5 wherein the entrainment lug 8 is rectilinear and has two shoulders 33, 33a which enable the shut-off member to be located with precision with respect to the axis of the manipulation spindle 3 which has a groove 35 in which the said lug 8 is engaged, the said groove 35 being perpendicular to the axis of the manipulation spindle.

At its end the lug 8 has a tongue 34 which is turned over after assembly, thus rendering the shut-off member captive of the manipulation spindle 3.

In this case mounting of the shut-off member is readily performed, the manipulation spindle 3 having already been installed the shut-off member 5 is inserted in the axis of the body 1, the lugs 8 and 9 being directed toward the interior of the body 1. Then the lug 8 and the fork 9 are simultaneously engaged respectively in the groove 35 of the manipulation spindle 3 and on the stub 11 and the manipulation spindle is caused to turn 180°; it is now sufficient to fold the tongue 34 onto the manipulation spindle.

In FIG. 17 there is shown a shut-off member 5 provided with a blade 36 of spring steel which is secured by one of its ends by welding points 37 to the bent end 8a of the lug 8, the said blade bearing at 38 against the central portion of the bottom 7 of the shut-off member and being prolonged by a forked portion 39 which is engaged on the stub 10 similar to the forked lug 9, but with a slight overhang, as is shown by FIG. 17. This arrangement enables an effect of compensation spring to be obtained, whereby the shut-off member is urged against the gasket 12.

There is thus concerned a self-compensating shut-off member which remains constantly supported against the gasket.

This arrangement is particularly indicated for utilisation at very low pressures and with gaskets of rigid or semi-rigid characteristics which provide no compensation or resilience.

Without going beyond the scope of the invention it is possible to contemplate mounting the stub for guiding the spherical segment only after the assembly thereof, either from the inside or via an external aperture, in which case the stub is made in the form of a cylindrical or threaded plug.

Equally without departing from the scope of the invention the inventor reserves his right of producing the body of the cock, still in one piece, but with conventional connection straps at its ends instead of the threaded connectors described in the Figures.

Various modifications may, of course, be made by the man skilled in the art to the devices or methods which have been described purely by way of non-limiting examples, without going beyond the scope of the invention.

What is claimed is:

1. A cock comprising a body, piping means for the flow of liquid connected to said body, a shut-off member rotatably mounted in the body by means of a manipulation member, said shut-off member comprising a dome with a spherical surface, a sealing gasket of annular shape secured to said body, the shut-off member comprising two lugs extending from the points of longest distance from said surface, said lugs being parallel to the axis of the shut-off member which passes through the center of the shut-off member, the first lug being connected to said manipulation member rotatably mounted in said body, the second lug having the shape of a fork which forms a recess, and a stub engaging with said recess, wherein the manipulation member is a spindle, the first lug is folded onto itself and has a square aperture in which a corresponding boss of the manipulation spindle is engaged.

* * * * *